(12) United States Patent
Villa et al.

(10) Patent No.: US 10,744,658 B2
(45) Date of Patent: Aug. 18, 2020

(54) NUCLEAR REACTOR LIGHT-BASED FUEL ALIGNMENT SYSTEMS AND METHODS

(71) Applicant: GE-Hitachi Nuclear Energy Americas LLC, Wilmington, NC (US)

(72) Inventors: James V. Villa, Sunset Beach, NC (US); Brian S. Hunt, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1929 days.

(21) Appl. No.: 14/196,687

(22) Filed: Mar. 4, 2014

(65) Prior Publication Data

US 2020/0203031 A1   Jun. 25, 2020

(51) Int. Cl.
  *G21C 19/00*  (2006.01)
  *B25J 19/02*  (2006.01)
  (Continued)

(52) U.S. Cl.
  CPC .................. *B25J 19/02* (2013.01); *B66C 1/00* (2013.01); *B66C 17/00* (2013.01); *G01B 11/00* (2013.01);
  (Continued)

(58) Field of Classification Search
  CPC ......... G21C 19/00; G21C 19/02; G21C 19/10
  (Continued)

(56) References Cited

U.S. PATENT DOCUMENTS 4,611,292 A   9/1986   Ninomiya et al.
4,929,413 A   5/1990   Kaufmann et al.
(Continued)

FOREIGN PATENT DOCUMENTS

EP   2915637   4/2018
ES   2915637   4/2018
(Continued)

OTHER PUBLICATIONS

English Machine Translation of Akira et al., Japanese Patent Publication, JP2009014474 (2009).*

(Continued)

*Primary Examiner* — Lily C Garner
(74) *Attorney, Agent, or Firm* — Ryan Alley IP

(57) ABSTRACT

Systems and methods determine locations of moving equipment in an area holding components to be moved. Moving equipment can relocate relative to the holding area to pick up components in the holding area from an origin and deliver them to a desired location or orientation. The moving equipment includes a device emitting a signal that is detectable where it hits components or other structures in a straight line or known path from the moving equipment. A human or computer can determine a position the moving equipment in the holding area from such signals. Devices can operate with visible light generators including LEDs, incandescent or fluorescent bulbs, and lasers and including lenses or reflectors to shape the light into detectable and high fidelity configurations. Automation components including a hardware processor, controller, and detector can operate moving equipment based on detected light, without human interaction or as a verification in human operations.

17 Claims, 7 Drawing Sheets

(51) Int. Cl.
  *B66C 1/00* (2006.01)
  *G01S 17/00* (2020.01)
  *G21C 19/18* (2006.01)
  *G06T 1/00* (2006.01)
  *G01B 11/00* (2006.01)
  *G21F 5/14* (2006.01)
  *G21C 19/20* (2006.01)
  *B66C 17/00* (2006.01)
  *G21C 19/10* (2006.01)

(52) U.S. Cl.
  CPC .............. *G01S 17/00* (2013.01); *G06T 1/00* (2013.01); *G21C 19/00* (2013.01); *G21C 19/10* (2013.01); *G21C 19/18* (2013.01); *G21C 19/20* (2013.01); *G21F 5/14* (2013.01)

(58) Field of Classification Search
  USPC ................................................. 376/262, 264
  See application file for complete search history.

(56) References Cited

U.S. PATENT DOCUMENTS

| | | | | |
|---|---|---|---|---|
| 5,526,384 | A | | 6/1996 | Joly |
| 5,586,158 | A | * | 12/1996 | Iwama .................. G21C 19/20 376/248 |
| 5,912,934 | A | * | 6/1999 | Acks ...................... G21C 19/02 376/248 |
| 5,994,688 | A | * | 11/1999 | Jackson ................ G01C 15/004 250/206.2 |
| 6,115,129 | A | | 9/2000 | Holmquist et al. |
| 9,061,421 | B2 | * | 6/2015 | Trompeter ............. B25J 9/1692 |
| 2012/0092643 | A1 | * | 4/2012 | Rintanen ................ B66C 13/46 356/4.01 |

FOREIGN PATENT DOCUMENTS

| | | | | |
|---|---|---|---|---|
| FR | 2640072 | A1 | | 6/1990 |
| GB | 2099655 | A | * | 12/1982 ......... B23K 26/0838 |
| JP | 5965203 | A | | 4/1984 |
| JP | 04116093 | A | | 4/1992 |
| JP | 2009014474 | A | | 1/2009 |
| JP | 6200441 | | | 9/2017 |
| MX | 358708 | | | 8/2018 |
| TW | I670728 | | | 9/2019 |

OTHER PUBLICATIONS

Westinghouse "Sure Trac Fuel Pool Index System", Sep. 2009.*
European Search Report and Opinion issued in connection with corresponding EP Application No. 15156814.4 dated Jul. 29, 2015.
Unofficial English Translation of Japanese Search Report issued in connection with corresponding JP Application No. 2015030118 dated Jan. 10, 2017.
Unofficial English Translation of Japanese Office Action issued in connection with corresponding JP Application No. 2015030118 dated Feb. 28, 2017.
Leuze Electronic, Sensor Solutions, Catalogue Apr. 3, 2014 (available at http://www.leuze-electronic.de/media/assets/dv007_144dpi_geschuetzt_pdf/SEG_Industry_Information_intra-logistics_en_144dpi.pdf).
Blaiklock, Crane Guidance Systems Using Laser Scanners, Maxview, Mar. 4, 2014 (available at https://www.tmeic.com/Repository/Media/Maxview_Crane_Guidance_Systems_Using_Laser_Scanners_1143664091.pdf).
Magnetek, LaserGuardtm, 2008 (available at http://www.ergonomicpartners.com/pdf/Magnetek-LaserGuard-Crane-Collision-Avoidance-System-Brochure.pdf).
Acuity, Hoist / Crane Application on a Palletizer Mar. 4, 2014 (available at http://www.acuitylaser.com/products/category/hoist-crane-application-on-a-palletizer).
Moduloc, Crane Positioning Monitoring, Mar. 4, 2014 (available at http://www.moduloc-usa.com/crane-positioning-monitoring.html).
Kim, Fuel Storage and Handling System, Nuclear Power Reactor Technology, Mar. 4, 2014 (available at http://www.kntc.re.kr/openlec/nuc/NPRT/module2/module2_2/module2_2_6/2_2_6.htm).
Bosch, GLL2-80 Dual Plane Leveling and Alignment Laser, Mar. 4, 2014 (available at http://www.boschtools.com/PRODUCTS/TOOLS/Pages/BoschProductDetail.aspx?pid=GLL2-80).

* cited by examiner

NUCLEAR REACTOR LIGHT-BASED FUEL ALIGNMENT SYSTEMS AND METHODS

BACKGROUND

As shown in FIG. 1, a nuclear power station conventionally includes a reactor pressure vessel 10 with various configurations of fuel and reactor internals for producing nuclear power. For example, vessel 10 may include a core shroud 30 surrounding a nuclear fuel core 35 that houses fuel structures, such as fuel assemblies, 40. A top guide 45 and a fuel support 70 may support each fuel assembly 40 in core 35 in specified locations. As shown in FIG. 1, each assembly 40 may occupy a position within a general cylindrical core 35; if each assembly 40 has a similar axial height, positions of assemblies within core 35 may be defined in horizontal and vertical offsets from a center or other reference point in core 35.

An annular downcomer region 25 may be formed between core shroud 30 and vessel 10, through which fluid coolant and moderator flows into the core lower plenum 55. For example, in US Light Water Reactor types, the fluid may be purified water, while in natural uranium type reactors, the fluid may be purified heavy water. In gas-cooled reactors, the fluid coolant may be a gas such as helium, with moderation provided by other structures. The fluid may flow upward from core lower plenum 55 through core 35. After being heated in core 35, the energetic fluid may enter core upper plenum 60 under shroud head 65.

FIG. 2 is an illustration of a portion of fuel core 35 from FIG. 1 showing several fuel assemblies 40 positioned about a control blade 80. During operation, control rod drive 12 (FIG. 1) maneuvers control rod blade 80 to a desired axial position among fuel assemblies 40 to obtain a desired power density. Control rod blade 80 typically has a cross or cruciform traverse cross-section; however, rods and other shapes are known control elements useable in nuclear reactors. Each fuel assembly 40 can include an outer channel 15 that surrounds several fuel rods or other nuclear fuel elements. A handle or bale 85 can interconnect with all components of assembly 40 to allow rigid body handling of assembly 40 with bale 85. Fuel assemblies 40 may extend throughout core 35 (FIG. 1), from a fuel support plate 70 at a bottom of core 35 to bales 85 at a top of core 35. In other locations, such as a spent fuel pool or new fuel loading area, fuel assemblies 40 may be similarly situated, without control elements.

Again in FIG. 1, vessel 10 may be sealed and opened through upper head 95 at flange 90. During plant fabrication and at regular service and/or refueling outages, upper head 95 may be removed and operators and/or equipment can access internals of vessel 10 for various purposes. For example, with access to the reactor internals, some of fuel bundle assemblies 40 may be replaced and/or moved within core 35, and maintenance/installation on other internal and external reactor structures may be performed.

FIG. 3 is an illustration of a related art refueling bridge with mast and grapple useable during outages with access to reactor vessel 10 to perform fuel offloading, reloading, shuffling, and/or maintenance. As shown in FIG. 3, a refueling bridge 1 may be positioned above or about flange 90 when reactor vessel 10 is opened. Bridge 1 may include a trolley 2 capable of rotating and/or laterally moving to any horizontal or vertical position above core 35 (FIG. 1). Trolley 2 may include a refueling mast 3 with hoist box and grapple 4. Hoist box and grapple 4 may be movable horizontally and vertically with trolley 2, such that mast 3 and hoist box and grapple 4 can be positioned above desired fuel assembly positions in core 35 with trolley 2. Hoist box and grapple 4 may axially extend from mast 3, such as through a winch or hydraulic force, to reach axially down to a top of fuel assemblies 40 in core 35 (FIG. 1). Grapple 4 may engage with a fuel assembly 40 via bale 85 or another fuel assembly component to lift, lower, reposition, rotate, or otherwise move assembly 40 to a desired position within core 35 or out of core 35 (FIG. 1). For example, hoist box and grapple 4 may move axially upward or downward with an engaged assembly 40 to remove or install the same within core 35, and/or hoist box and grapple 4 may rotate about an axis or move with trolley 2 to another desired horizontal/vertical core location with assembly 40 for shuffling or removal.

As shown in FIG. 3 a local camera and/or light 5 can be attached to hoist box or grapple 4. Camera and/or light 5 may record and/or illuminate a fuel assembly 40 nearby engaged directly below grapple 4 to permit visual inspection of the fuel assembly below hoist box and grapple 4 during access periods. Camera and/or light 5 may be electrically and/or communicatively connected to a control module or receiver in trolley 2 or to permit inspection or recording of fuel assemblies as they are handled for fuel inspectors.

SUMMARY

Example embodiments include systems for positioning and/or locating maneuvering devices within a handling area. Maneuvering devices can include a wide variety of handling equipment, including cranes, hoists, grapples, refueling bridges or masts, moveable palates, forklifts, warehouse robots, Kiva lifting rovers, etc. that can move within the handling area to interact with various structures or articles stored in the area. Handling areas can include a warehouse, an assembly floor, a nuclear reactor or core of the same, a spent fuel pool, a fuel holding area, a manufacturing plant, a storage yard, etc. where articles are placed in various positions and moved to different positions to achieve operational goals. The maneuvering devices move relative to these articles and may interact with the articles by lifting or engaging and moving the articles within the area. One or more electromagnetic devices move with the maneuvering devices to shine relatively precise electromagnetic radiation on the articles, area, and/or area boundaries so that an operator, like a human user or electromagnetic detector, can determine a position and/or orientation of the maneuvering device relative to the area and/or relative to the articles at defined positions within the area. The electromagnetic devices can include several types of emitters, including visible light generators like LEDs, incandescent or fluorescent bulbs, lasers, etc., some of which may generate relatively directed, and potentially coherent, beams of light that form lines or planes through the use of lenses and/or reflectors.

Example systems are useable with automatic devices like a hardware processor and controller that can operate the maneuvering devices based on detected light, without human interaction or as a verification in human operations. Such a properly-configured computer may store a list of articles and other points of interest by position in the handling area and move the maneuvering device to these desired positions to manipulate or move the article, using the light position from an emitter on the maneuvering device to determine maneuvering device location. For example, a computer processor may work off a list of desired fuel moves that includes a series of initial and final bundle positions, and possible orientations. Laser emitters on a mast or other fuel handling structure may shine a laser line that hits a reactor wall, top guide, or other structure that is in a known, rigid position relative to core positions in the reactor, and a detector in or around the reactor may detect and process these locations where the lasers shine to determine fuel handling structure position and/or orientation. The processor and controlling electronics can move the handling structures, sometimes with fuel, between the original and final locations and/or orientations using the laser points to calculate or verify placement until the list of moves is complete.

Several different configurations of maneuvering device and electromagnetic devices are useable in example embodiments, as long as electromagnetic emissions are emitted from the maneuvering devices in a known fashion. For example, several emitters may be attached at various angles to emit in different directions from the maneuvering device. Different emitters may be individually operable and can be turned off or use different light characteristics to properly identify maneuvering device location or orientation. Emitters and electromagnetic radiation emitted therefrom can be calibrated against known offsets or interference to ensure accurate position determination from reflection of the radiation. Electromagnetic devices useable as emitters can be configured based on their environment of use; those used in a nuclear reactor may be waterproof and/or hardened against radiation for example.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
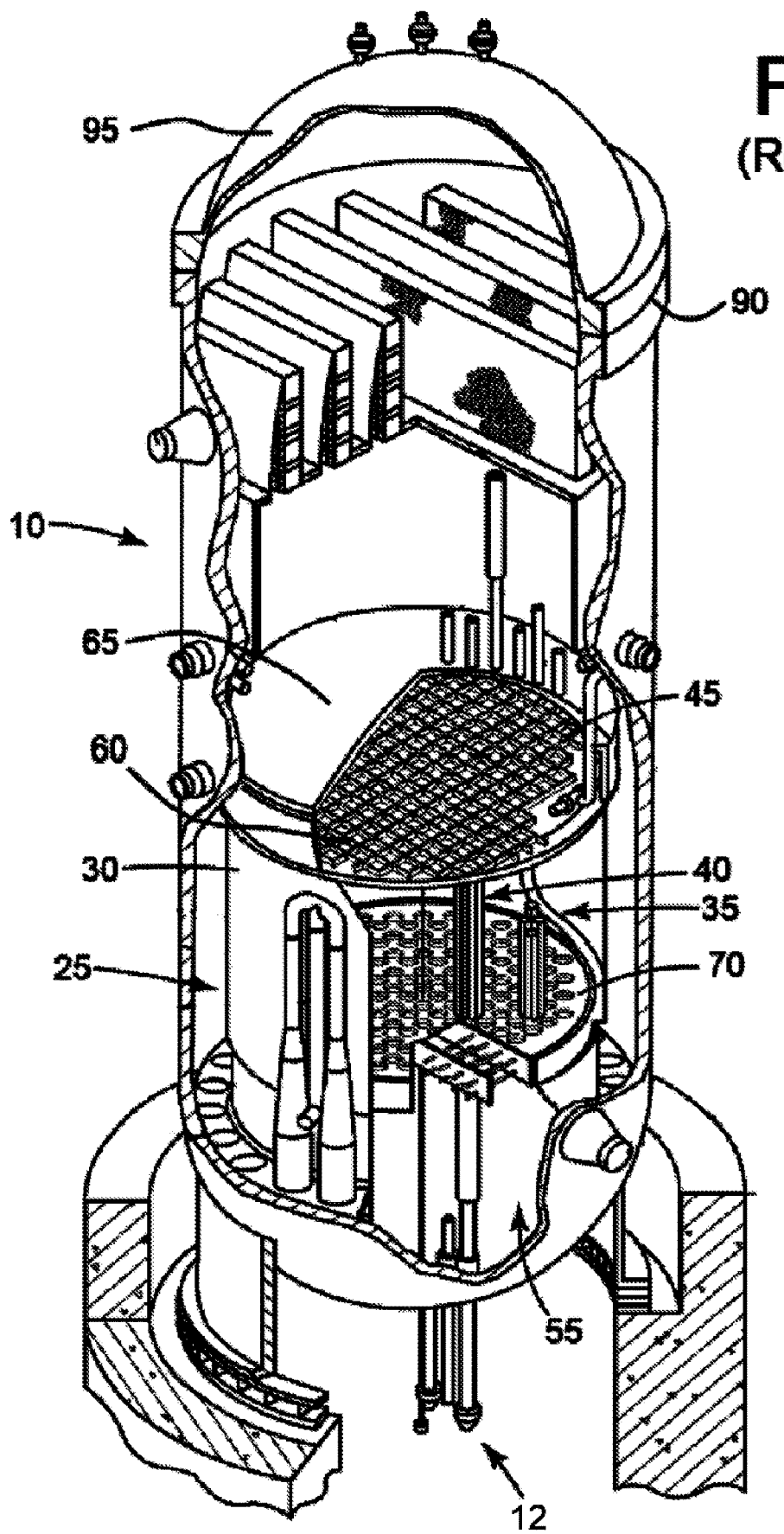
FIG. 1 is an illustration of a related art nuclear power vessel and internals.
Figure 2:
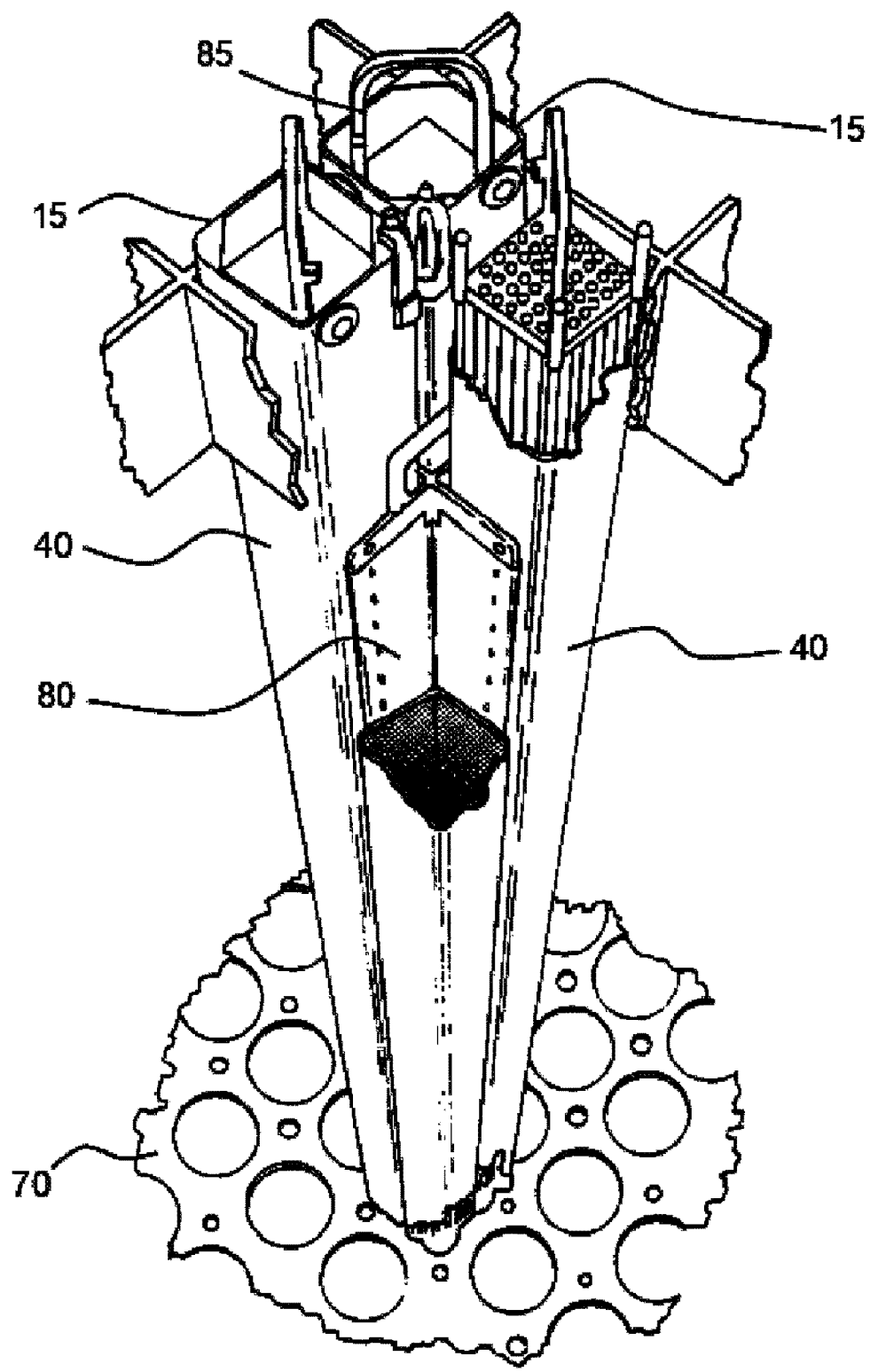
FIG. 2 is an illustration of a controlled group of related art fuel assemblies in use with a control rod blade.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The inventors have recognized problems arising from existing positioning and alignment systems that rely on distance determination or movement calculations in a master piece of handling equipment. For example, a related art trolley 2 on refueling bridge 1 (FIG. 3) may use electrical interlocks to move the same horizontally or vertically without respect to actual position of fuel assemblies or core positions to be accessed. Thus, even fine movements to set positions of trolley 2 and attached mast 3 (FIG. 1) may not align with core positions or fuel, requiring local visual verification of proper fuel and location identity with in-core cameras, which may take time and have low precision, further requiring slow fuel movement and several (re-) verification steps during fuel shuffling. The inventors have recognized that a clear, quick reference for position determination of handling equipment with respect to fuel bundles, core positions, or other articles to be handled may eliminate the need for repeated visual inspection or human intervention in maneuvers entirely. The below disclosure uniquely overcomes these and other problems, and uniquely leverages these and other advantages, recognized by the inventors in nuclear fuel and other article maneuvering equipment.

The present invention is systems and/or methods that allow location determination of handling equipment relative to structures that are handled by the equipment in a particular area using light reflected from the area and/or structures to determine the location. In contrast to the present invention, the few example embodiments and example methods discussed below illustrate just a subset of the variety of different configurations that can be used as and/or in connection with the present invention.

Figure 4:
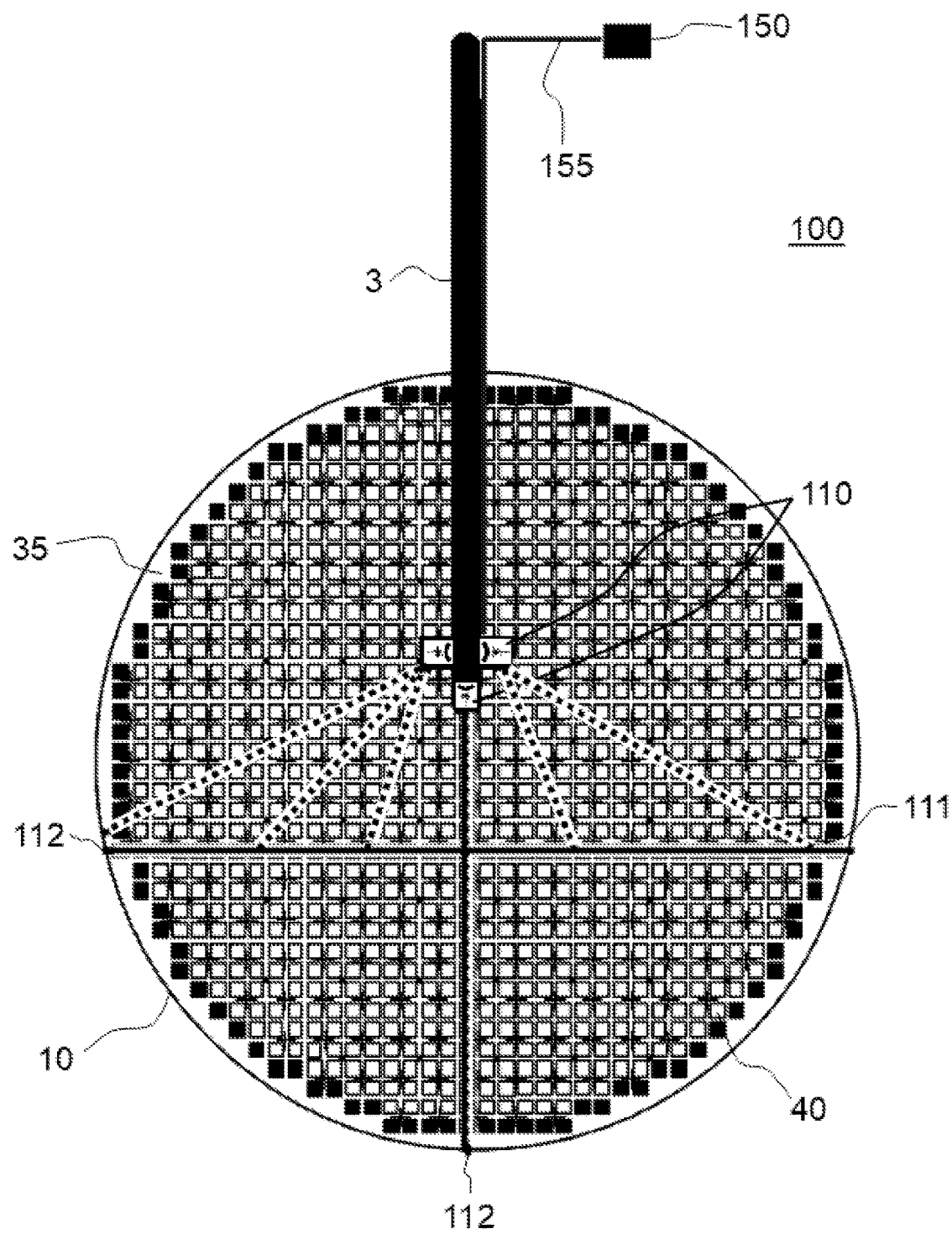
FIG. 4 is an illustration of an example embodiment fuel handling equipment position and alignment system.

FIG. 4 is a schematic of a nuclear reactor core 35 using an example embodiment alignment system 100. As shown in FIG. 4, individual squares represents fuel assemblies 40 or positions for the same within core 35 inside reactor 10 when viewed from an axial height. Although FIG. 4 illustrates a core with approximately 1132 fuel assemblies, like those found in an Economic Simplified Boiling Water Reactor designs, other core sizes and shapes are useable with example embodiments. As defined herein, "horizontal" and "vertical" are perpendicular directions on a plane of core 35 of FIG. 4, whereas "axial" is a depth direction at least some degree into, or out of, FIG. 4 and perpendicular to both the horizontal and vertical.

As shown in FIG. 4, a refueling mast 3 may descend axially toward core 35 during periods of access to reactor 10, such as during outages, plant fabrication or decommissioning, and/or other maintenance times. Mast 3 may be an existing or related art mast that descends from a trolley 2 or refueling bridge 1 like in FIG. 3, or another type, such as one suspended by a crane, for example, and include fuel handling structures, like a hoist box and/or grapple for lifting, rotating, placing, and/or otherwise moving fuel assemblies 40 and potentially other nuclear plant structures.

Example embodiment alignment system 100 includes at least one visible line emitter 110 positioned with mast 3. Visible line emitter 110 may be any device that can generate and cast a visible and straight beam of light 111 in reactor 10 with sufficient coherence to reach a peripheral position of core 35 with straight fidelity while being perceptible to operators or other visual sensors. For example, visible line emitter 110 may be a laser and/or a focused LED light.

Visible line emitter 110 in example embodiment system 100 is configured to operate in a nuclear reactor environment and may be hardened against radiation and/or be sealed to be fluid-tight for operations within depths of reactor coolant. For example, visible line emitter 110 and any associated communication or power connections may be fabricated entirely of materials that do not entrain radioactive particles or significantly change physical characteristics when exposed to radiation in a fueled nuclear reactor, and/or visible line emitter 110 may be sealed in a transparent case that prevents fluid ingress and/or contamination.

Visible line emitter 110 may be locally powered and operated, such as with a collocated battery, or may be remotely powered or operated, such as through a supply line 155 and power source 150 and/or a remote wireless connection, for example. Emitters 110 may also replace or be used with conventional local lights or cameras 5 (FIG. 1), which may already include power leads and attachment points to a lower grapple where emitters 110 may be installed. In this way, operators or automatic systems may activate and deactivate, or even change direction or light characteristics of, emitter 110 remotely, like in trolley 2 (FIG. 3) or in offsite locations.

As a specific example, visible line emitter 110 may be a higher-powered red laser that emits plane of light 111 (shown with dashed lines at some points of the plane) via a plane-creating lens. The planar beam 111 has sufficient intensity to be visible through twenty-five feet of water in reactor 10, which tends to absorb red wavelengths. Plane of light 111 may extend in an axial-horizontal plane from emitter 110. Where plane of light 111 intersects with fuel 40 or other structures at a top of core 35, a red line may be formed that is readily visible against typical greens and blues encountered in a reactor environment. Given sufficient strength, plane of light 111 may be visible even if generated from a top of core 35 during fuel manipulation. Or, for example, visible line emitter 110 may be an incandescent or fluorescent white light with a parabolic reflector or lens that generates a highly-focused straight beam of light 111 with sufficient intensity to be visible at a relatively precise edge position dozens of meters away.

Figure 3:
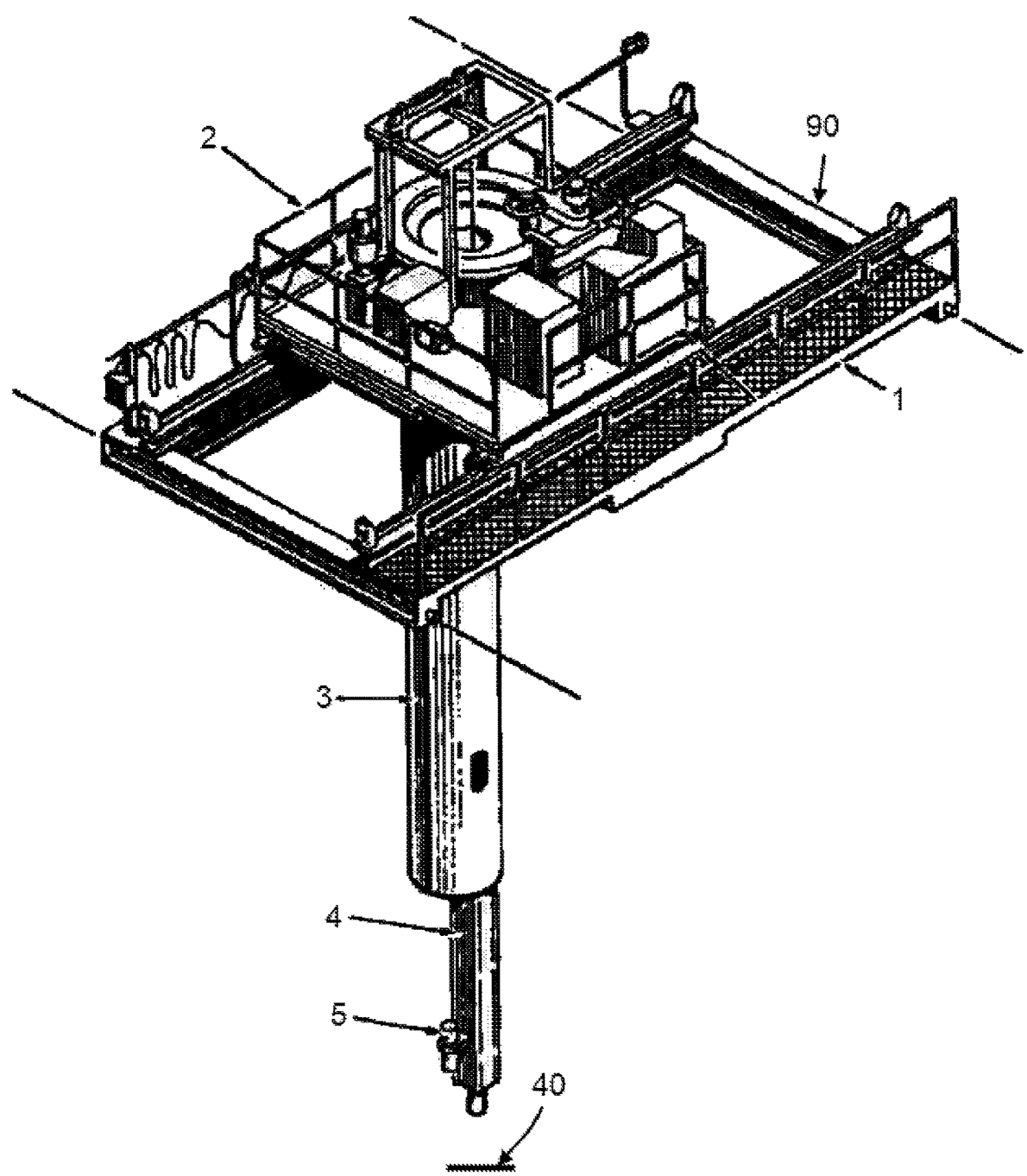
FIG. 3 is an illustration of a related art refueling bridge.

Visible line emitter 110 is positioned about mast 3 at any position that directs a line of light to a periphery of core 35, including at a top or bottom of mast 3 directly on mast 3, on a refueling bridge 1 shown in FIG. 3, on a telescoping hoist box and grapple, etc., for example. So positioned, visible line emitter 110 casts a beam of light 111 to an intersection point 112 near a periphery that allows for position and/or alignment determination of emitter 110 with respect to a fuel assembly 40, core 35, reactor 10, and/or another structure of interest. Visible line emitter 110 may be installed at any time during access to reactor 10 and/or mast 3 or any other structure to which emitter 110 is attached. For example, emitters 110 may be removably attached to mast 3 (FIG. 3) at a start of an outage and removed after an outage, or emitters 110 could be permanent features of trolley 2, installed with trolley 2 during plant fabrication or later as an upgrade modification.

For example, visible line emitter 110 may be attached to a bottom of mast 3 facing vertically downward, in a cardinal direction of a bottommost point of reactor 10. Beam of light 111 created by emitter 110 may create an intersection point 112 with a lower edge of reactor 10, allowing an operator to determine horizontal position of emitter 110. Intersection point 112 may also be created with another peripheral structure in or around reactor 10, potentially one with specific and accurate horizontal and vertical degradations reflecting positions in core 35, like a top guide 45 (FIG. 1) within reactor 10 or a graduated index around a flange of reactor 10. Similarly, angular measurements from a base 0-degree orientation, which may be square with fuel assemblies 40, may be given for comparison against intersection points 112 to determine rotation relative to the base orientation.

From intersection point 112, an operator or other detector may further determine horizontal position of mast 3 relative to core 35 and fuel assemblies 40 therein, by virtue of emitter 110 being rigidly attached to mast 3. An operator or detector may also determine related positions like fuel assembly 40 location and/or trolley positioning, relative to reactor 10. If beam of light 111 is relatively strong and thin, such as from a laser casting a point of light several millimeters thick, intersection point 112 may provide a quick and high-precision indicator of position of emitter 110 relative to reactor 10 and/or core 35. Similarly, if beam of light 111 is a plane generated from a planar lens or several emitters 110, a fairly solid line 111 may be generated by intersection with tops of assemblies 40 to intersection point 112, providing for easy identification of intersection point 112 and positions determinable therefrom, between mast 3 and intersection point 112.

As shown in FIG. 4, multiple visible line emitters 110 can be used in example embodiment system 100. While a single visible line emitter 110 can generate a single line of light 111 and intersection point 112, multiple line emitters 110 may generate several lines 111 and/or intersection points 112 from which several different types of position/alignment determinations can be made. Multiple visible line emitters 110 may be distinct devices separately attached, powered, and/or operated in example embodiment system 100, or a unitary device capable of emitting several lines, such as a laser cross-plane emitter like a Bosch GLL2-80 Dual Plane Leveling Laser adapted for reactor use. Multiple visible line emitters 110 can be located at varied angular and/or axial positions, emit different shades and/or intensities of light, and/or be independently operable, in order to provide positioning and alignment information in a variety of reactor operations.

For example, four visible line emitters 110 can be used, each positioned at a 90-degree increment about a bottom of mast 3, similar to the arrangement shown in FIG. 4. In this way, each emitter 110 can cast a beam of light 111 in 90-degree increments and create four intersection points 112 at edges of core 35. Four intersection points 112 may permit both horizontal and vertical offset of mast 3 with respect to core 35, assemblies 40, and reactor 10. From these horizontal and vertical positions, an operator or program can determine at which fuel assembly 40 or open position in core 35 mast 3 is operating. If emitters 110 in this example are planar emitters, a relatively solid line from intersection points 112 to a center cross at a fuel assembly 40 or open position in core 35 may be formed for easy verification or position correction of fuel handling equipment to a desired assembly or core location.

Figure 5:
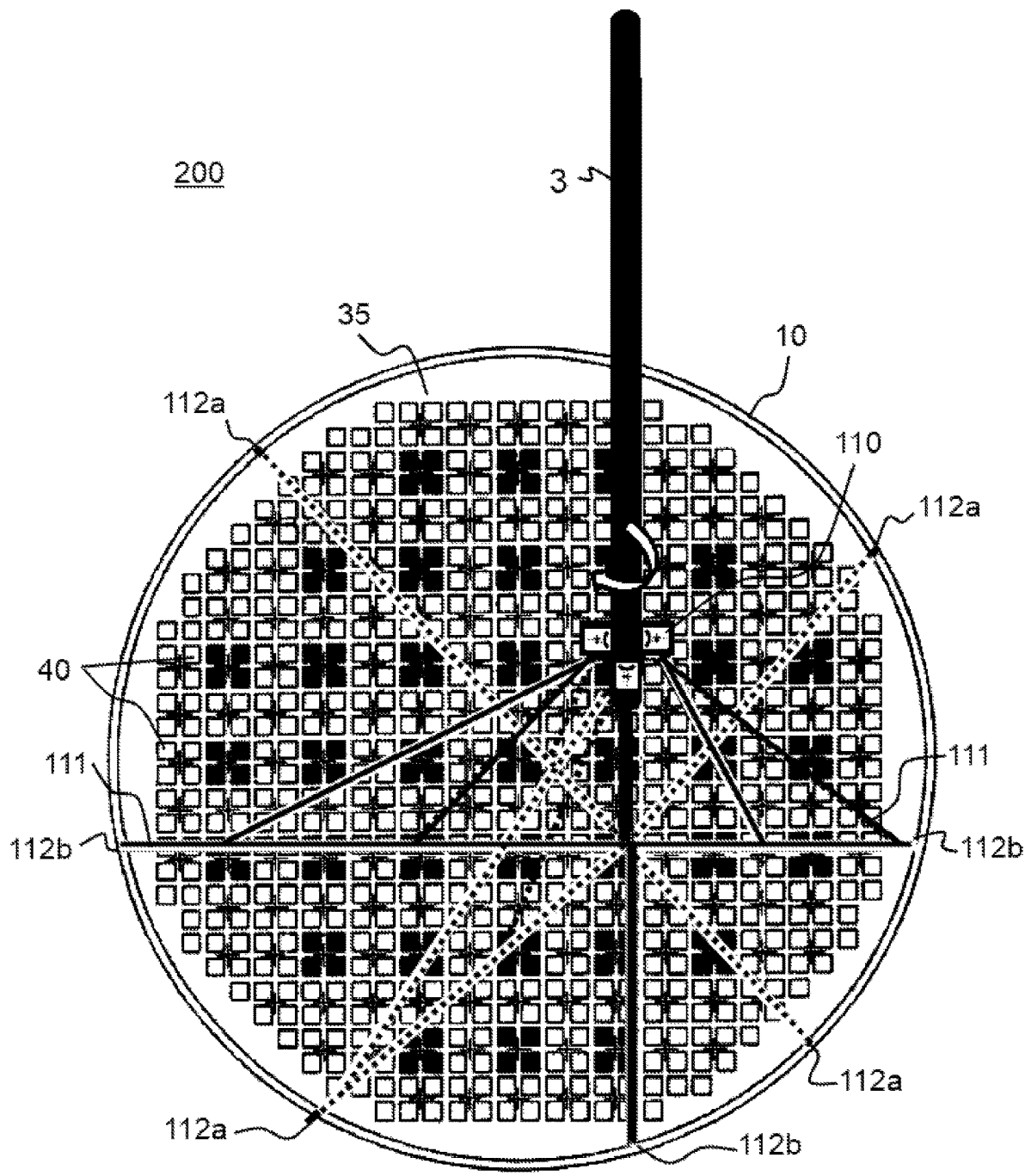
FIG. 5 is an illustration of another example embodiment fuel handling equipment position and alignment system.

FIG. 5 is similar to FIG. 4, showing a finer placement of several visible line emitters 110 in example embodiment system 200 using a rotatable mast 3. As shown in FIG. 5, up to eight visible line emitters 110 can be arranged at 45-degree increments around set positions of mast 3. In the example of FIG. 5, mast 3 can further be rotated about its axis, as shown by the arrow, in additional to vertical and horizontal translation during fuel maneuvers.

Multiple visible line emitters 110 at smaller angle increments may allow for visual verification of alignment and position at several rotation positions of mast 3. For example, as mast 3 rotates to 45 degrees from a base orientation, such as while handling a fuel bundle, only a subset of four cardinally-aligned visible line emitters 110 may be used to determine position. As shown in FIG. 5, four emitters 110 associated with true vertical and horizontal may be used, with light beams 111 and cardinal intersection points 112b used for position determination when mast 3 is rotated 45 degrees. Non-aligned emitters 110 associated with intersection points 112a may be ignored, as they do not show true horizontal or vertical position when rotated. Similarly, as mast rotates to 90 degrees, the other four emitters 110 may be used as their intersection points 112a will now align with the vertical and horizontal edges of reactor 10 for position determination, while the first four emitters 110 creating intersection points 112b, no non-aligned, may be ignored.

Multiple emitters 110 may be independently operable. In this way an operator or program may turn off emitters 110 at rotations, or other positions, of mast 3 where beams of light 111 from such emitters do not align with horizontal or vertical or are otherwise not useful, while activating emitters 110 aligned with horizontal and vertical. This may prevent operator confusion and assure only a few intersection points (112b in FIG. 5) that properly correspond to horizontal and vertical are relied upon for positioning of mast 3, fuel assembly 40, trolley 2, etc.

Similarly, if at least one visual line emitter 110 emits a different type of light in a unique beam 111, users or other visual observers may associate the unique type(s) of light with an individual visual line emitter 110 at a particular position about mast 3. In this way users may determine both relative rotation of mast 3 as well as which intersection points 112 reflect true horizontal and vertical based on positioning of intersection point 112 of the unique light beam.

As a further example of how multiple emitters 110 may be operated with a rotating mast 3 while not losing intersection points 112 at true horizontal and vertical positions, emitters 110 may be rotatable on mast 3 or other structure to which emitters 110 connect in order to remain pointed in the cardinal horizontal and vertical directions with respect to core 35 and reactor 10. For example, emitters 110 may be mounted on a track attached to mast 3 and include a motor that counter-rotates emitters 110 on the track as mast 3 rotates. Such a track and motor may be in communication with operator signals from trolley 2 where an operator controls mast rotation, in order to counter-rotate multiple emitters 110. In this example, an additional emitter 110 may still be directly attached or otherwise rotatable with mast 3 in order to determine rotation of mast 3. Such an additional emitter 110 may use a unique colored light or have a unique light pattern, direction, strobe, etc. in order to differentiate any intersection point 112 generated thereby as a rotational indicator and not a vertical or horizontal positioning point.

Wherever visible line emitters 110 are attached in example embodiment systems, an operator or visual inspection system can calibrate the known position against potential distortion, including redirection caused by passing through fluid surface or temperature gradient, as well as offset from structures of interest, potentially caused by bowing or spurious movement. For example, with a visible line emitter 110 attached to a bottom of mast 3 but above a grapple that extends and directly interacts with assembly 40, a known vertical/horizontal/twist offset or bowing in the grapple relative to the bottom of mast 3 may be accounted for in determining grapple position from intersection point 112 from emitter 110. Similarly, if a visible line emitter 110 is attached to a trolley 2 above a coolant in reactor 10, an operator can calibrate system 100 to account for refraction by moving trolley 2 to a known location and measuring intersection point 112 versus the known position. Such calibration may be undertaken at each outage or maintenance period and/or whenever emitters 110 are installed.

Figure 6:
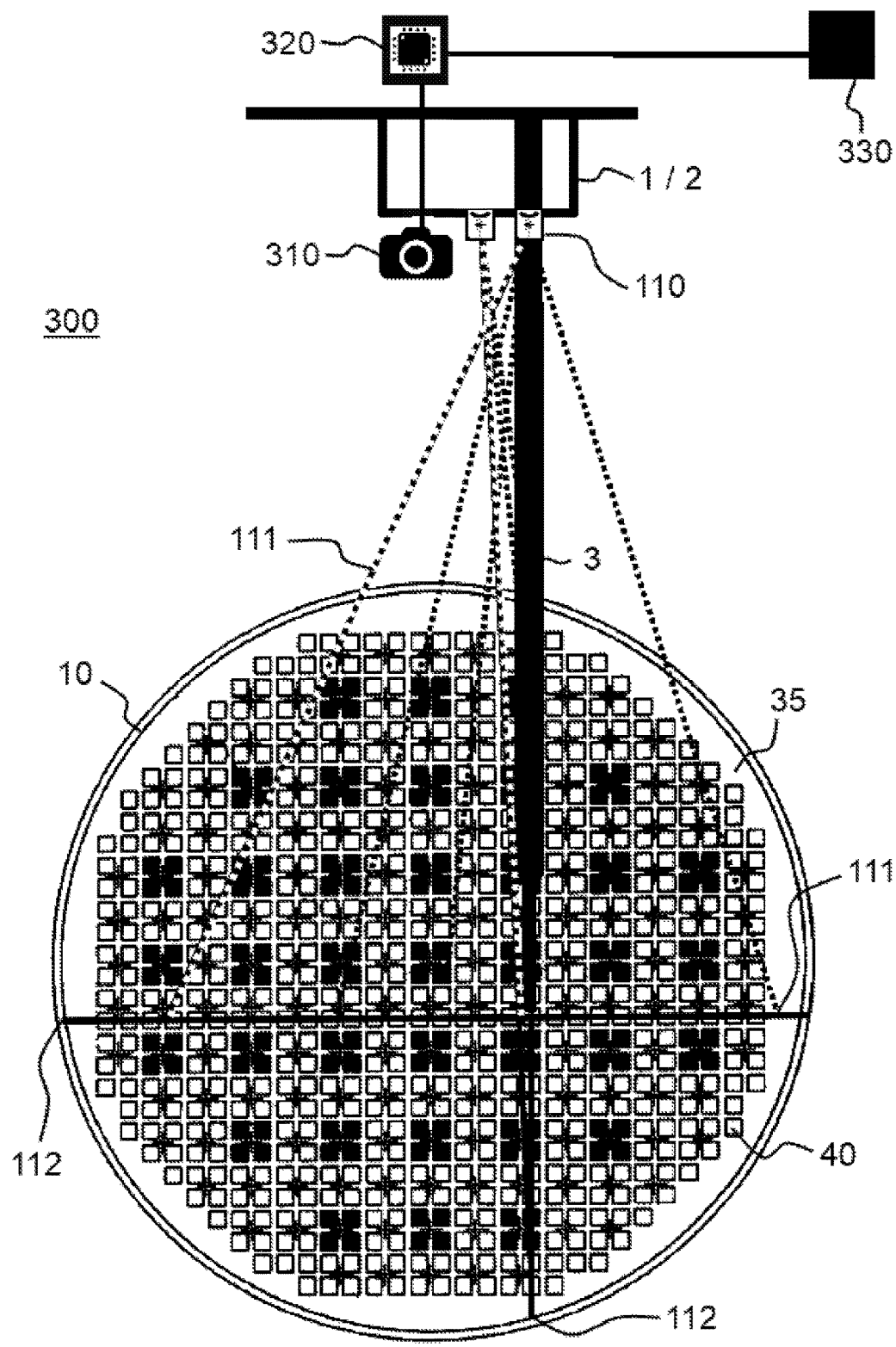
FIG. 6 is an illustration of another example embodiment fuel handling equipment position and alignment system.

FIG. 6 is a schematic of another example embodiment system 300 that may use emitters 110 to automatically determine positions of trolley 2, bridge 1, mast 3, fuel assembly 40 or core position of the same, etc. As shown in FIG. 6, two visible line emitters 110 are mounted to a trolley 2 or bridge 1, above opened reactor 10, in this example. Visible line emitters 110 may emit bright green, planarized laser beams 111 in system 300, with sufficient intensity and sweep to reach a periphery of reactor 10 and create visible intersection points 112 that match vertical and horizontal position of the fuel management structures 1, 2, 3, 4, etc. relative to core 35.

Because two emitters 110 may be at a same axial level but offset (next to one another) in a horizontal or vertical position on trolley 2 or bridge 1, emitters 110 may compensate by being slightly angled to account for their offset based on a depth of core 35 in reactor 10. In this way, emitters 110 may form an intersection or cross between their two planes 111 with precision on a fuel assembly 40 or core position directly below and subject to operations by trolley, bridge, mast, grapple, etc. That is, a higher intensity intersection of beams planar 111 themselves may fall on a location accurately and precisely associated with position of emitters 110 and structures connected thereto. Of course, calibration as discussed above may be undertaken with respect to emitter positioning, angling, and/or calculation of a known offset (due to bowing, refraction, drift, spurious movement, etc.) between equipment to which emitters 110 are attached and true position in core 35 in order to assure accuracy of a relationship between trolley/bridge/mast/grapple positioning and fuel/core location position as calculated from beams of light 111 and/or intersection points 112.

As shown in FIG. 6, a visual detection device 310, like a camera or lens package with photodiode or other sensor, is also positioned to view lines 111 and intersection points 112 created in reactor 10 by emitters 110. Visual detection device 310 may be similarly mounted alongside emitters 110 or can be at any other position having visual access to reactor 10, including mounted above or inside reactor 10 at a fixed position. Visual detection device 310 may be specifically configured to detect a unique type of light generated by emitters 110. For example, emitters 110 may operate at a specific frequency of light, and visual detection device 310 may be calibrated to filter out other light frequencies from those created by emitters 110.

Camera 310 is connected to a visual processor 320. Processor 320 may include one or more computer processors connected to and programmed or otherwise configured to control the various elements of example embodiment system 300. Processor 320 may further be configured to execute example methods, including processing visual data from camera 310 to determine position of other elements, controlling trolley 2 or bridge 1, and/or controlling fuel movement and shuffling, for example. Processor 320 can be any computer processor, potentially with associated processor cache, transient memory, video buffer, etc., configured or programmed to processes visual information from camera 310 and determine intersection points 112, position and intersection of beams of light 111, and/or a fuel assembly 40 or position in core 35 at which mast 3 will interact, for example.

Processor 320 is connected to an operations controller 330 that may actuate and move any one of bridge 1, trolley 2, mast 3, grapple box 4 (FIG. 3), and any other fuel manipulation structure. Based on input from processor 320, controller 330 can move these structures to desired positions in core 35 and initiate fuel movement, including grappling individual fuel assemblies and extension of any grapple box to raise or lower fuel secured thereto. For example, processor 320 may be programmed with an order of fuel movement by initial and final placement in core 35 and, by reading intersection points 112 and intersection of light beams 111, determine proper placement of trolley, bridge, mast, grapple, etc. to reach the final and initial positions with high accuracy. Processor 32 may instruct controller 330 to move fuel management structures to these determined positions, verify absolute or relative position of the same, and/or initiate fuel installation or removal at the determined positions. Or, for example, a human operator, in trolley 2 or at a remote location, may control fuel shuffling through controller 330 and receive verification of proper positioning and sequencing from similar operations of processor 320.

Given the variety of example functions described herein, example embodiment systems may be structured in a variety of ways to provide desired functionality. Although networked elements and functionalities of example embodiment system 300 are shown in FIG. 6 as individual components with specific groupings and subcomponents, it is understood that these elements may be co-located in a single device having adequately differentiated data storage and/or file systems and processing configurations. Alternatively, elements shown in FIG. 6, like visual detector 310, visual processor 320, and controller 330 may be remote and plural, with functionality shared across several pieces of hardware, each communicatively connected at adequate speeds to provide necessary data transfer and analysis, if, for example, more resources or better logistics are available in distinct locations. Other divisions and/or omissions of structures and functionalities among any number of separate modules, processors, and/or servers are useable with example embodiment positioning systems, including execution on a single machine or among distant, exclusive servers and processors.

Figure 7:
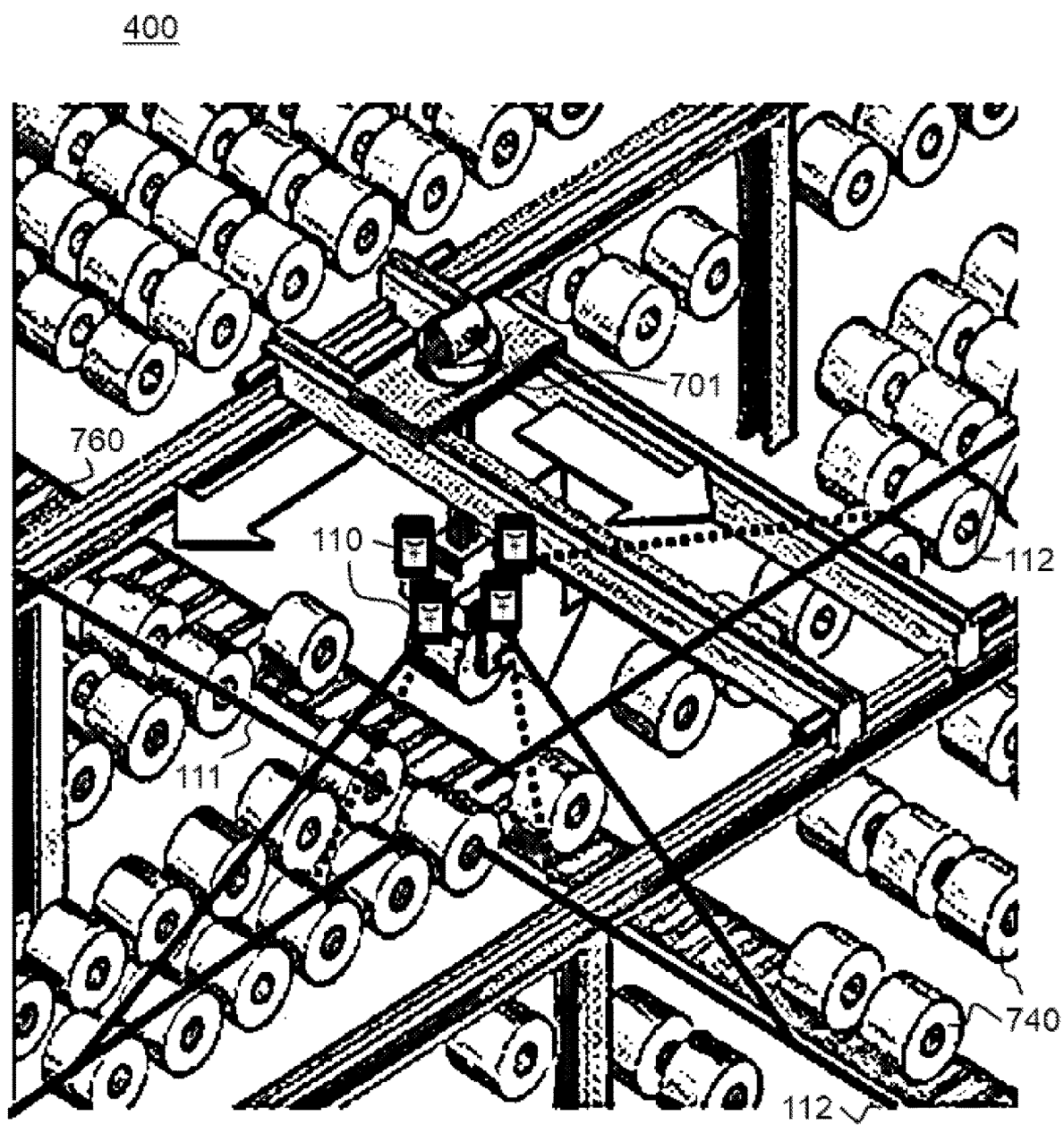
FIG. 7 is an illustration of an example embodiment article handling equipment position and alignment system.

Although example embodiments have been shown in FIGS. 4-6 in a nuclear reactor setting, it is understood that other environments are compatible with example systems and methods. For example, instead of reactor 10, a spent fuel pool or fuel holding or storage area may be equally useable with example systems, with proper recalibration of emitter positioning and potentially light-emitting characteristics to account for a different size of the area. Or, for example, as shown in FIG. 7, an example embodiment system 400 may operate in a manufacturing plant, warehouse, or storage yard facility. In FIG. 7, several articles 740 are arranged about a facility floor, potentially about several pieces of handling or manufacturing equipment, like conveyor 760. A crane or hoist 701 may be freely moveable horizontally and vertically above articles 740 and include a grapple, hook, magnet, etc. capable of lifting and/or otherwise moving articles 740.

As shown in FIG. 7, multiple visual line emitters 110 are attached to crane 701, where emitters 110 emit beams of light 111 axially down to articles 740. Beams of light 111 may be planar or linear, and may reach a floor periphery or other position-determining or graduated element around articles 740 at intersection points 112. If beams 111 create multiple lines along articles 740 where they hit a floor, a user, camera, or other visual detection device may similarly identify position of crane 701 based on convergence of such lines. Similar to other example, intersection points 112 and/or location of beams of light 111 may be used to determine absolute or relative position of crane 701 and properly position crane 701 over an article 740 for interaction and/or relocate crane 701 already holding an article 740 to a desired deposit location, such as conveyor belt 760.

Example embodiment system 400 is further useable with automated systems and method, like those of example embodiment system 300. For example, a processor and controller may be programmed to access articles in specific known positions in system 400, and such a processor and controller, through a visual detection device, can automatically move crane 701 to positions matching desired articles 740 by using detected intersection points 112, beams of light 111, and/or combinations of the same. Crane 701 may then be lowered to grab or release a desired article at the verified position.

Example systems being described above with several different types of functionality, example methods are apparent therefrom. For example, nuclear reactor operators may use example systems to automate fuel movement and handling between a reactor core and fuel holding area by installing visual emitters on fuel handling machines and controlling their movement with a processor-based visual detection system that moves the machines and fuel handled thereby between desired locations determinable with the emitted light. Similarly, operators may verify positioning and orientation of fuel handling structures as well as core locations where fuel is ultimately placed based on the location of emitted light(s) and intersections of the same. Operators of other facilities may similarly use example systems to properly position handling equipment and articles to be manipulated by the same.

Example embodiments and methods thus being described, it will be appreciated by one skilled in the art that example embodiments may be varied and substituted through routine experimentation while still falling within the scope of the following claims. For example, although beams of light in example embodiments may be directed toward articles and assemblies to be moved, it is understood that light may be directed away, or in another direction, toward a different structure that allows positional determination of handling equipment relative to the articles. A variety of different reactor and core designs are compatible with example embodiments and methods simply through proper dimensioning of example embodiments—and fall within the scope of the claims. Such variations are not to be regarded as a departure from the scope of these claims.

What is claimed is:

1. A system for positioning handling structures with articles for handling, the system comprising:
a handling structure moveable over an area bounded by a boundary structure and populated by at least one article, wherein the handling structure is configured to move the article;
a first emitter rigidly attached to the handling structure configured to emit visible light forming a first plane; and
a second emitter rigidly attached to the handling structure configured to emit visible light forming a second plane, wherein an intersection of the first plane and the second plane forms a line extending directly from the area axially upward toward the handling structure, wherein an intersection of the first plane and the boundary structure creates a first visible intersection point horizontally aligned with the handling structure, and wherein an intersection of the second plane and the boundary structure creates a second visible intersection point vertically aligned with the handling structure.

2. The system of claim 1, further comprising:
a sensor configured to detect at least one of, the intersection of the first plane and the second plane, and the first and the second intersection points; and
a computer processor configured to determine a position of the handling structure from the at least one of, the intersection of the first plane and the second plane, and the first and the second intersection points.

3. The system of claim 2, further comprising:
a controller configured to move the handling structure over the area and raise and lower the handling structure to move the article, wherein the computer processor is further configured to control the controller to move the handling structure based on the determined position.

4. The system of claim 3, wherein the computer processor is further configured to control the controller to move the handling structure based on a list of positions versus articles.

5. The system of claim 4, further comprising:
the area, wherein the area is a nuclear reactor core; and
the article, wherein the article is a nuclear fuel assembly, and wherein the handling structure is a refueling bridge including an axially extensible mast that moves the nuclear fuel assembly.

6. A system for determining position of fuel handling structures in a nuclear reactor environment, the system comprising:
a fuel handling structure moveable over a volume populated by nuclear fuel;
an emitter system rigidly attached to the handling structure, wherein the emitter system emits, a first visible plane of light axially downward and horizontally to visibly intersect a boundary structure of the volume at a first point and a nuclear fuel assembly of the nuclear fuel, and a second visible plane of light axially downward and vertically to visibly intersect the boundary structure at a second point and the nuclear fuel assembly, wherein the first visible plane of light and the second visible plane of light intersect each other only on a line extending axially upward from the nuclear fuel assembly to the fuel handling structure.

7. The system of claim 6, wherein the emitter system is rigidly attached to a refueling bridge, a trolley on the refueling bridge, a mast extending axially from the trolley, or a grapple extending axially from the mast.

8. The system of claim 7, wherein the volume is a nuclear fuel core in a nuclear reactor, and wherein the boundary structure is at an outermost periphery of the core.

9. The system of claim 8, wherein the emitter system configured to operate underwater in reactor coolant water emit light visible after passing through at least twenty-five feet of the coolant water.

10. The system of claim 8, wherein the first and the second planes of light are formed by lasers.

11. The system of claim 6, further comprising:
a sensor configured to detect the first point and the second point; and
a computer processor configured to determine a position of the fuel handling structure from the first and the second points.

12. The system of claim 11, further comprising:
a controller configured to move the fuel handling structure over the volume and raise and lower the fuel handling structure with respect to the volume, wherein the computer processor is further configured to control the controller to move the fuel handling structure based on the determined position.

13. The system of claim 12, wherein the computer processor is further configured to control the controller to move the handling structure based on a list of core positions versus fuel assemblies.

14. The system of claim 6, wherein the emitter system includes an offset emitter, wherein the fuel handling structure includes a mast extending axially from a refueling bridge, and wherein the offset emitter is mounted on the refueling bridge.

15. The system of claim 14
wherein the offset emitter is a different color and separately operable from other emitters of the emitter system.

16. The system of claim 14
wherein the offset emitter is configured to emit the first plane of light.

17. The system of claim 16, wherein the first plane of light is at an angle to the axial direction, and wherein the second plane of light is only in the axial direction.

* * * * *